(12) United States Patent
Recio et al.

(10) Patent No.: US 11,949,604 B2
(45) Date of Patent: Apr. 2, 2024

(54) INTEGRATED NETWORK SWITCH OPERATION

(71) Applicant: INTERNATIONAL BUSINESS MACHINES CORPORATION, Armonk, NY (US)

(72) Inventors: Renato J. Recio, Austin, TX (US); Eran Gampel, Tel Aviv (IL); Claude Basso, Nice (FR); Gal Sagi, Hod Hasharon (IL); Guy Laden, Tel Aviv (IL)

(73) Assignee: Inernational Business Machines Corporation, Armonk, NY (US)

( * ) Notice: Subject to any disclaimer, the term of this patent is extended or adjusted under 35 U.S.C. 154(b) by 81 days.

(21) Appl. No.: 17/450,097

(22) Filed: Oct. 6, 2021

(65) Prior Publication Data
US 2023/0108374 A1 Apr. 6, 2023

(51) Int. Cl.
*H04L 12/879* (2013.01)
*H04L 49/00* (2022.01)
*H04L 49/90* (2022.01)

(52) U.S. Cl.
CPC ...... *H04L 49/9026* (2013.01); *H04L 49/3027* (2013.01)

(58) Field of Classification Search
CPC ....... H04L 45/742; H04L 45/00; H04L 69/22; H04L 45/02; H04L 45/54; H04L 45/38; H04L 45/42
See application file for complete search history.

(56) References Cited

U.S. PATENT DOCUMENTS

| | | | |
|---|---|---|---|
| 8,065,721 B1 * | 11/2011 | Shah | H04L 63/0263 726/13 |
| 9,807,006 B1 | 10/2017 | Stark et al. | |

(Continued)

FOREIGN PATENT DOCUMENTS

EP 2849395 A1 3/2015

OTHER PUBLICATIONS

Chole, Sharad et al.; dRMT: Disaggregated Programmable Switching; SIGCOMM '17; Aug. 21-25, 2017; 14 pages.

(Continued)

*Primary Examiner* — Wutchung Chu
(74) *Attorney, Agent, or Firm* — Schmeiser, Olsen & Watts, LLP; Edward Wixted

(57) ABSTRACT

A system, method, and computer program product for implementing network state processing is provided. The method includes detecting operational states for ports of a server Internet protocol (IP) data plane component of an integrated switching device. Each operational state is analyzed and matching and action rules associated with the operational states are generated with respect to data packets arriving at the ports. Data describing each operational state is stored within a port cache structure of a port. An incoming data packet is detected at a first port and the matching and action rules are distributed between port engines of the ports. The matching and action rules are executed with respect to the incoming data packet and the incoming data packet is transmitted to a destination port. Operational functionality of the integrated switching device is enabled with respect to execution of the incoming data packet at the destination port.

20 Claims, 10 Drawing Sheets

(56) References Cited

U.S. PATENT DOCUMENTS

| | | | |
|---|---|---|---|
| 10,063,407 B1* | 8/2018 | Kodeboyina | H04L 45/64 |
| 10,193,977 B2* | 1/2019 | Ke | H04L 67/1097 |
| 10,237,206 B1* | 3/2019 | Agrawal | H04L 45/22 |
| 10,257,122 B1* | 4/2019 | Li | H04L 45/54 |
| 10,313,231 B1* | 6/2019 | Bosshart | H04L 45/44 |
| 10,404,619 B1* | 9/2019 | Agrawal | H04L 45/48 |
| 10,516,626 B1* | 12/2019 | Kodeboyina | H04L 49/25 |
| 10,623,309 B1 | 4/2020 | Gampel | |
| 10,997,106 B1* | 5/2021 | Bandaru | G06F 13/385 |
| 11,201,831 B1* | 12/2021 | Jain | H04L 49/3072 |
| 11,636,053 B2* | 4/2023 | Kim | G06F 13/107 710/74 |
| 2004/0032869 A1* | 2/2004 | Ambe | H04L 45/26 370/428 |
| 2014/0040459 A1* | 2/2014 | Agrawal | H04L 12/4641 709/224 |
| 2014/0192646 A1* | 7/2014 | Mir | H04L 47/2441 370/235 |
| 2015/0312206 A1* | 10/2015 | Nakano | H04L 41/0806 370/392 |
| 2016/0226795 A1 | 8/2016 | Zhang et al. | |
| 2016/0226959 A1* | 8/2016 | Zhang | H04L 41/0654 |
| 2016/0277282 A1* | 9/2016 | Chen | H04L 45/122 |
| 2016/0320993 A1* | 11/2016 | Oota | G06F 11/2089 |
| 2017/0230284 A1* | 8/2017 | Yamashita | H04L 45/74 |
| 2018/0285288 A1 | 10/2018 | Bernat | |
| 2018/0287932 A1* | 10/2018 | Viquez Calderon | H04L 45/125 |
| 2019/0108045 A1* | 4/2019 | Lee | G06F 11/3608 |
| 2019/0182367 A1* | 6/2019 | Kim | H04L 45/74 |
| 2020/0053190 A1 | 2/2020 | Uddin | |
| 2020/0099625 A1* | 3/2020 | Yigit | H04L 45/302 |
| 2020/0336425 A1* | 10/2020 | Galles | H04L 49/109 |
| 2020/0358692 A1* | 11/2020 | Wang | H04L 45/20 |
| 2020/0394060 A1* | 12/2020 | Chandrappa | G06F 9/45558 |
| 2021/0021883 A1* | 1/2021 | Parekh | H04N 21/237 |
| 2021/0089236 A1* | 3/2021 | Yang | G06F 3/0659 |
| 2021/0092786 A1* | 3/2021 | Uddin | H04W 76/15 |
| 2021/0103536 A1* | 4/2021 | Galles | G06F 9/30101 |
| 2021/0266253 A1* | 8/2021 | He | H04L 49/70 |
| 2022/0045940 A1* | 2/2022 | Subrahmanya | G06F 16/907 |
| 2022/0052970 A1* | 2/2022 | Radi | H04L 45/24 |
| 2022/0124035 A1* | 4/2022 | Lee | H04L 43/0888 |
| 2022/0166698 A1* | 5/2022 | Lee | H04L 47/283 |
| 2022/0210075 A1* | 6/2022 | Musleh | H04L 47/127 |
| 2022/0311711 A1* | 9/2022 | Jepsen | H04L 47/27 |
| 2022/0353174 A1* | 11/2022 | Kfir | H04L 45/22 |
| 2022/0400083 A1* | 12/2022 | Chandrasekaran | H04L 47/562 |
| 2023/0015075 A1* | 1/2023 | Phoenix | H04L 63/0236 |
| 2023/0021019 A1* | 1/2023 | Phoenix | H04L 63/168 |

OTHER PUBLICATIONS

Hauser, Frederik et al.; P4-IPsec: Site-to-Site and Host-to-Site VPN with IPsec in P4-Based SDN; arXiv: 1907.03593v2; Jul. 5, 2020; 18 pages.

Kim, Daehyeok et al.; Generic External Memory for Switch Data Planes; HotNets-XVII; Nov. 15-16, 2018; 7 pages.

Mell, Peter et al.; "The NIST Definition of Cloud Computing;" National Institute of Standards and Technology; Special Publication 800-145; Sep. 2011; 7 pages.

Mohammadkhan, Ali et al.; P4NFV: P4 Enabled NFV Systems with SmartNICs; 2019 IEEE Conference on Network Function Virtualization and Software Defined Networks; Nov. 12-14, 2019; 7 pages.

ISR & WO, Applicant's file reference P202007232, International Application No. PCT/EP2022/077033, date of mailing Jan. 31, 2023, 10 pages.

* cited by examiner

INTEGRATED NETWORK SWITCH OPERATION

BACKGROUND

The present invention relates generally to a method for processing a network state associated with an integrated network switch and in particular to a method and associated system for improving network switching technology associated with detecting operational states for ports, generating actions associated with the operational states with respect to data packets arriving at the ports, and enabling operational functionality of the integrated switching device with respect to execution of an incoming data packet at a destination port.

SUMMARY

A first aspect of the invention provides an integrated switching device comprising a processor coupled to a computer-readable memory unit, the memory unit comprising instructions that when executed by the processor implements a network state processing method comprising: detecting, by the processor, operational states for ports of a server Internet protocol (IP) data plane component; analyzing, by the processor, each operational state of the operational states; generating, by the processor based on results of the analyzing, matching and action rules associated with the operational states with respect to data packets arriving at the ports; storing, by the processor, data describing each the operational state within at least one port cache structure for at least one port of the ports; detecting, by the processor, an incoming data packet at a first port of the ports; distributing, by the processor, the matching and action rules between port engines of the ports and the processor; executing, by the processor in response to the detecting and the distributing, the matching and action rules with respect to the incoming data packet; transmitting, by the processor in response to results of the executing, the incoming data packet to a destination port of the ports; and enabling, by the processor, operational functionality of the integrated switching device with respect to execution of the incoming data packet at the destination port.

A second aspect of the invention provides a network state processing method comprising: detecting, by a processor of an integrated switching device, operational states for ports of a server Internet protocol (IP) data plane component; analyzing, by the processor, each operational state of the operational states; generating, by the processor based on results of the analyzing, matching and action rules associated with the operational states with respect to data packets arriving at the ports; storing, by the processor, data describing each the operational state within at least one port cache structure for at least one port of the ports; detecting, by the processor, an incoming data packet at a first port of the ports; distributing, by the processor, the matching and action rules between port engines of the ports and the processor; executing, by the processor in response to the detecting and the distributing, the matching and action rules with respect to the incoming data packet; transmitting, by the processor in response to results of the executing, the incoming data packet to a destination port of the ports; and enabling, by the processor, operational functionality of the integrated switching device with respect to execution of the incoming data packet at the destination port.

A third aspect of the invention provides a computer program product, comprising a computer readable hardware storage device storing a computer readable program code, the computer readable program code comprising an algorithm that when executed by a processor of an integrated switching device implements a network state processing method, the method comprising: detecting, by a processor of an integrated switching device, operational states for ports of a server Internet protocol (IP) data plane component; analyzing, by the processor, each operational state of the operational states; generating, by the processor based on results of the analyzing, matching and action rules associated with the operational states with respect to data packets arriving at the ports; storing, by the processor, data describing each the operational state within at least one port cache structure for at least one port of the ports; detecting, by the processor, an incoming data packet at a first port of the ports; distributing, by the processor, the matching and action rules between port engines of the ports and the processor; executing, by the processor in response to the detecting and the distributing, the matching and action rules with respect to the incoming data packet; transmitting, by the processor in response to results of the executing, the incoming data packet to a destination port of the ports; and enabling, by the processor, operational functionality of the integrated switching device with respect to execution of the incoming data packet at the destination port.

The present invention advantageously provides a simple method and associated system capable of automating network state processing associated with a network switch.

DETAILED DESCRIPTION

Figure 1:
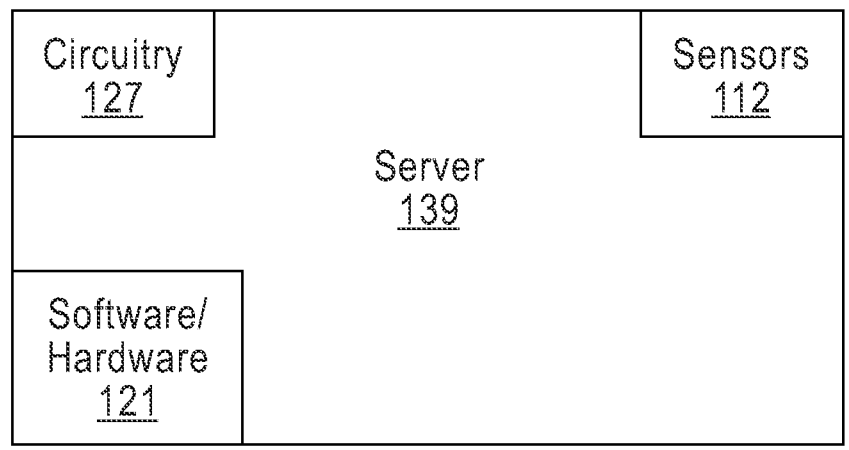
FIG. 1 illustrates a system for improving network switching technology associated with detecting operational states for ports, generating actions associated with the operational states with respect to data packets arriving at the ports, and enabling operational functionality of an integrated switching device with respect to execution of an incoming data packet at a destination port, in accordance with embodiments of the present invention.
Figure 1:
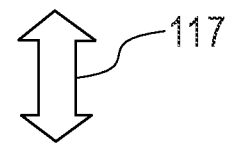
Figure 1:
Figure 1:
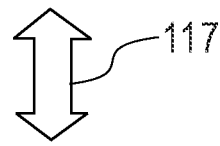
Figure 1:
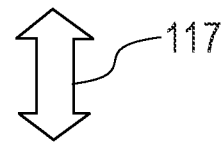
Figure 1:
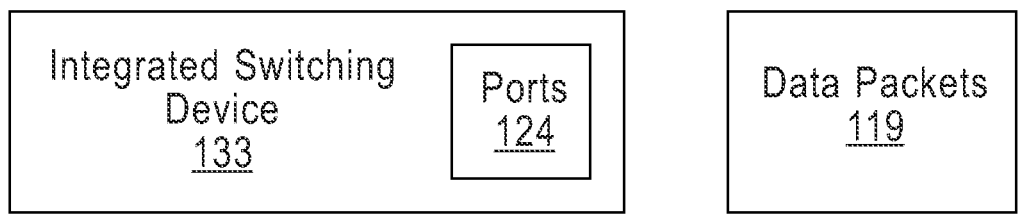
Figure 1:
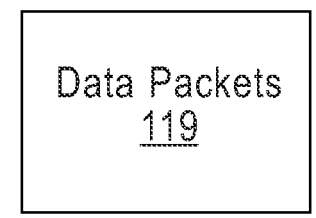

System FIG. 1 illustrates a system 100 for improving network switching technology associated with detecting operational states for ports, generating actions associated with the operational states with respect to data packets arriving at the ports, and enabling operational functionality of an integrated switching device 133 with respect to execution of an incoming data packet at a destination port, in accordance with embodiments of the present invention. Typical cloud network systems are configured to provide a process for maintaining and processing a server IP data plane endpoint state within a host on each port of a network interface controller (NIC). The aforementioned process is performed via execution of a combination of: host CPU cycles, P4 engine cycles, hardware logic, and NIC CPU cycles. Executing a combination of: host CPU cycles, P4 engine cycles, hardware logic, and NIC CPU cycles used for processing a server IP data plane endpoint state may comprise an inefficient process requiring multiple resources thereby consuming excessive power and providing a costly option. Therefore, system 100 is enabled to perform server IP data plane endpoint state processing within an integrated switch via execution of per port P4 or HW-logic engines and caches and centralized CPU cores. Likewise, system 100 allows an IP endpoint state to be cached per port and be pulled from a central CPU when needed. Associated match/action rules may be distributed between per port engines and a central CPU such that if a packet arrives and associated rules are not within per port caches, packet rule processing may be performed by pulling rules from a central CPU unit's memory or by transferring a packet to the central CPU's memory and have the packet rule processing performed by the central CPU.

System 100 is configured to improve and enhance a process for distributing an IP network state pipeline between decentralized P4 units, ternary content-addressable memory (TCAM), and cache structures associated with each port and a centralized P4/unit with external CPU/memory.

Integrated switching device 133 (i.e., a P4 structure) comprises an architecture for enabling an integrated solution for distributing IP network state processing and storage between: decentralized (per port) P4 engines and an associated cache structure and a centralized P4/CPU processing unit that utilizes external memory shared across switch ports. Likewise, integrated switching device 133 is configured to eliminates a need for dedicated CPUs on each port thereby moving control plane processing to a centralized CPU.

System 100 of FIG. 1 includes a server 139, integrated switching device 133, data packets 119, and a network interface controller 153 interconnected through a network 117. Server 139 comprises sensors 112, circuitry 127, and software/hardware 121. Server 139 and integrated switching device 133 each may comprise an embedded device(s). An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, server 139 and integrated switching device 133 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-10. The specialized discrete non-generic analog, digital, and logic-based circuitry (e.g., sensors 112, circuitry/logic 127, software/hardware 121, etc.) may include proprietary specially designed components (e.g., a specialized integrated circuit, such as for example an Application Specific Integrated Circuit (ASIC) designed for only implementing an automated process for improving network switching technology associated with detecting operational states for ports, generating actions associated with the operational states with respect to data packets arriving at the ports, and enabling operational functionality of integrated switching device 133 with respect to execution of an incoming data packet at a destination port. Sensors 112 may include any type of internal or external sensors including, inter alia, GPS sensors, Bluetooth beaconing sensors, cellular telephone detection sensors, Wi-Fi positioning detection sensors, triangulation detection sensors, activity tracking sensors, a temperature sensor, an ultrasonic sensor, an optical sensor, a video retrieval device, humidity sensors, voltage sensors, network traffic sensors, etc. Network 117 may include any type of network including, inter alia, a local area network, (LAN), a wide area network (WAN), the Internet, a wireless network, etc.

System 100 is configured to enable an integrated P4 Smart switch (i.e., integrated switching device 133) with distributed processing and state information and control. System 100 enables the following functionality:

1. Performing server IP data plane endpoint state processing within integrated switching device via execution of per port P4 or hardware (HW) logic engines, caches, and centralized CPU cores.
2. Caching an IP endpoint state per port such that the IP endpoint may be pulled from a central CPU when needed.
3. Distributing match/action rules between per port engines and a central CPU such that if a packet arrives and the match/action rules are not in the per port caches, packet rule processing may be performed by pulling the match/action rules from the central CPU unit's memory or transferring the packet to the central CPUs.

Figure 2:
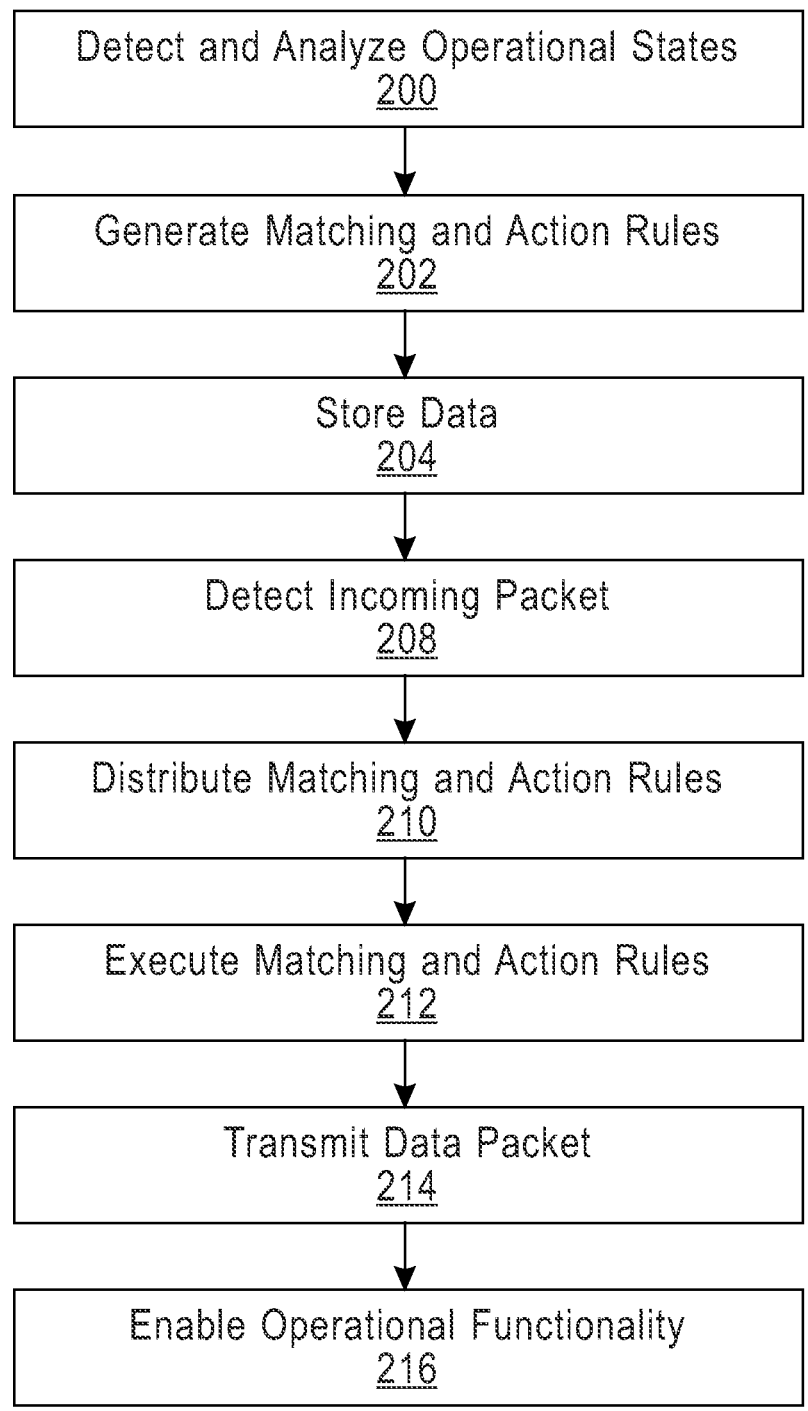
FIG. 2 illustrates an algorithm detailing a process flow enabled by the system of FIG. 1 for improving network switching technology associated with detecting operational states for ports, generating actions associated with the operational states with respect to data packets arriving at the ports, and enabling operational functionality of an integrated switching device with respect to execution of an incoming data packet at a destination port, in accordance with embodiments of the present invention.

FIG. 2 illustrates an algorithm detailing a process flow enabled by system 100 of FIG. 1 for improving network switching technology associated with detecting operational states for ports, generating actions associated with the operational states with respect to data packets arriving at the ports, and enabling operational functionality of an integrated switching device with respect to execution of an incoming data packet at a destination port, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by server 139 and integrated switching device 133 of FIG. 1. In step 200, operational states for ports of a server Internet protocol (IP) data plane component are detected by a processor of an integrated switching device. Each operational state is analyzed. In step 202, matching and action rules are generated based on results of step 200. The matching and action rules are associated with the operational states with respect to data packets arriving at the ports. The processor may include centralized programming protocol-independent packet processor (P4) code comprising the matching and action rules. Alternatively, the processor may include decentralized programming protocol-independent packet processor (P4) code comprising the matching and action rules.

In step 204, data describing each operational state within at least one port cache structure for at least one port is stored. In step 208, an incoming data packet is detected at a first port of the ports. In strep 210, the matching and action rules are distributed between port engines of the ports and a processor of the integrated switching device. Distributing the matching and action rules may include:

1. Detecting that the matching and action rules are not located within the least one port cache structure.
2. Retrieving the matching and action rules from an internal memory of the processor for processing.
3. Detecting that a buffer of the destination port is currently available.
4. Enabling transmission of incoming data packet is transmitted to a destination port.

As a first alternative, distributing the matching and action rules may include:

1. Detecting that the matching and action rules are not located within the at least one port cache structure.
2. Transferring the matching and action rules to an internal memory of the processor for execution.
3. Detecting that a buffer of the destination port is currently available.
4. Enabling transmission of an incoming data packet to a destination port.

As a second alternative, distributing the matching and action rules may include:

1. Detecting that a buffer of the destination port is currently available.
2. Enabling transmission of an incoming data packet to a destination port.

As a third alternative, distributing the matching and action rules may include:

1. Detecting that the matching and action rules are located within said least one port cache structure.
2. Enabling transmission of an incoming data packet to a destination port.

In step 212, the matching and action rules are executed with respect to the incoming data packet. In step 214, the incoming data packet is transmitted to a destination port of the ports. In step 216, operational functionality of the integrated switching device is enabled with respect to execution of the incoming data packet at the destination port.

Figure 3:
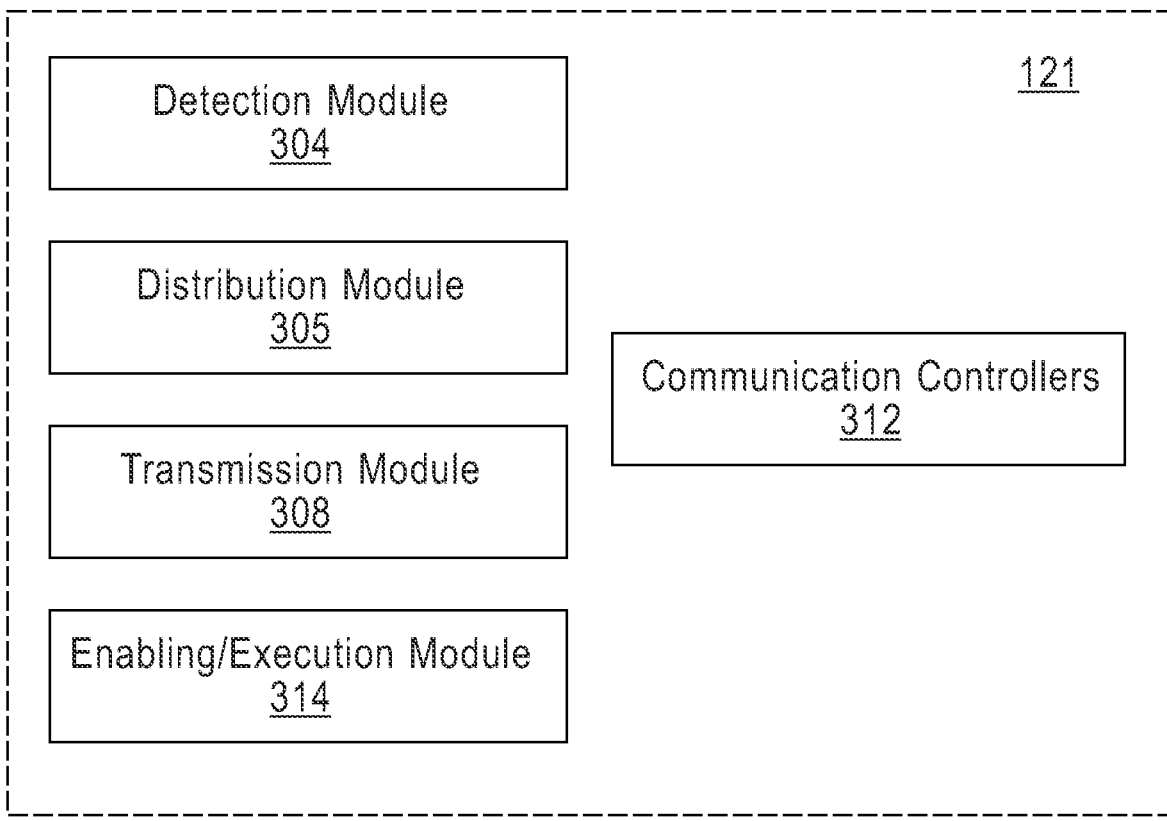
FIG. 3 illustrates an internal structural view of the software/hardware of FIG. 1, in accordance with embodiments of the present invention.

FIG. 3 illustrates an internal structural view of software/hardware 121 (i.e., 121) of FIG. 1, in accordance with embodiments of the present invention. Software/hardware 121 includes a detection module 304, a distribution module 305, a transmission module 308, an enabling/executing module 314, and communication controllers 312. Detection module 304 comprises specialized hardware and software for controlling all functions related to the detecting steps of FIG. 2. Distribution module 305 comprises specialized hardware and software for controlling all functionality related to the distribution steps described with respect to the algorithm of FIG. 2. Transmission module 308 comprises specialized hardware and software for controlling all functions related to the transmitting steps of FIG. 2. Enabling/executing module 314 comprises specialized hardware and software for controlling all functions related to the executing and device enabling steps of the algorithm of FIG. 2. Communication controllers 312 are enabled for controlling all communications between detection module 304, distribution module 305, transmission module 308, and enabling/executing module 314.

Figure 4:
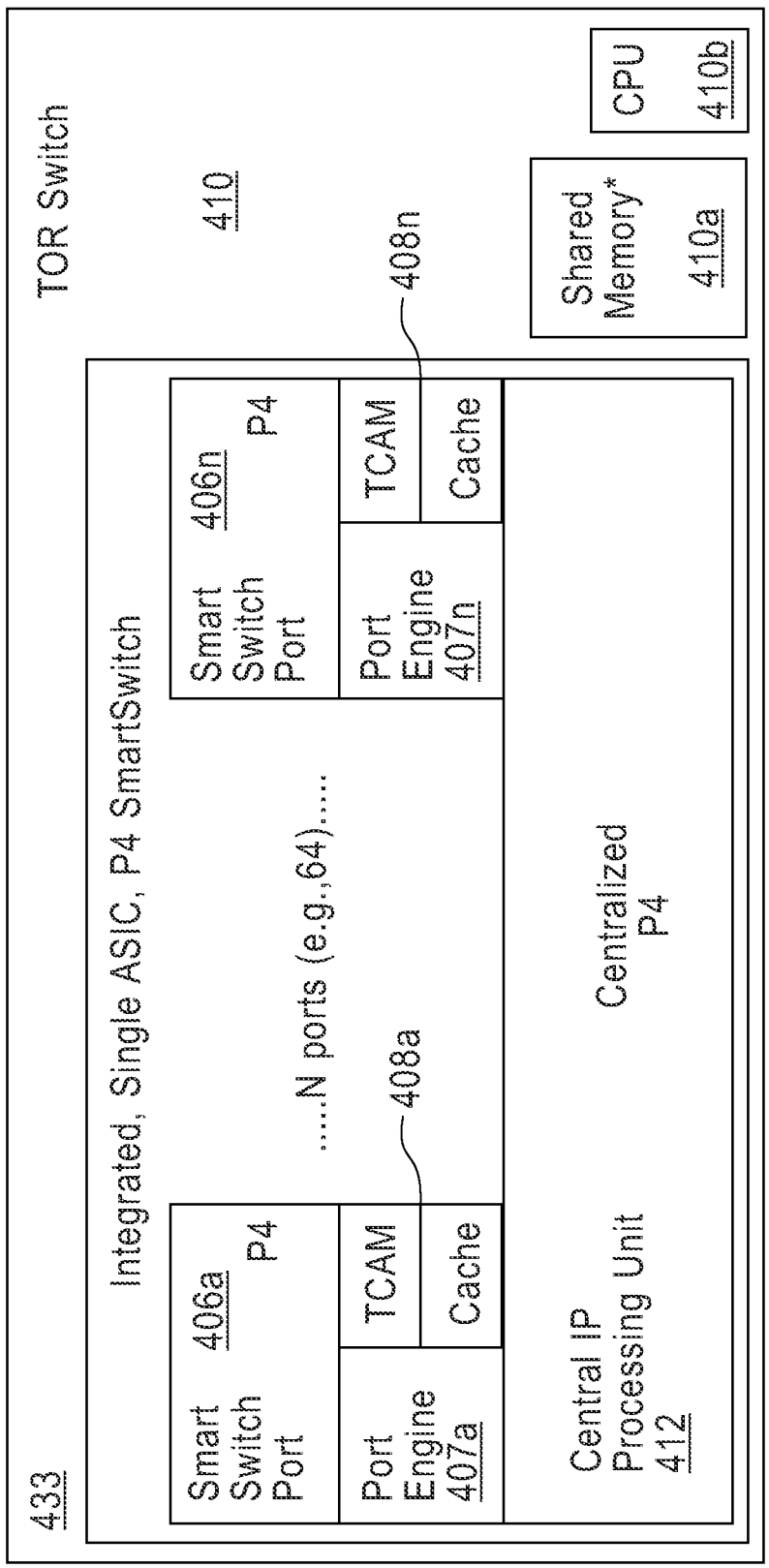
FIG. 4 illustrates an integrated P4 switching device enabled via the system of FIG. 1, in accordance with embodiments of the present invention.

FIG. 4 illustrates an integrated P4 switching device 433 enabled via system 100 of FIG. 1, in accordance with embodiments of the present invention. Integrated P4 switching device 433 enables an integrated architecture for distributing IP network state processing and storage between internal: decentralized (per port) P4 engines 407a . . . 407n and associated cache structures 408a . . . 408n of switch ports 406a . . . 406n. Likewise, integrated P4 switching device 433 enables an integrated architecture for enabling an internal centralized processing unit 412 using external memory 410a shared across switch ports 406a . . . 406n. Integrated P4 switching device 433 further includes an onion router (TOR) switch 410 comprising external memory 410a and a CPU 410b.

Integrated P4 switching device 433 eliminates a need for dedicated CPUs on each of switch ports 406a . . . 406n and likewise enables control plane processing to an internal centralized processing unit 412 thereby reducing an amount of silicon needed for generating an application specific integrated circuit (ASIC) required for containing integrated P4 switching device 433.

Integrated P4 switching device 433 is configured to cache an IP network state per each fully contained in external memory 410a connected to internal centralized processing unit 412. A network state may include, inter alia, security groups referenced per transmission control protocol (TCP) connection or for every user datagram protocol (UDP); a multiprotocol label switching (MPLS) label referenced for ingress/egress packets between a backbone and software defined networking (SDN); an SDN overlay for visual networking index (VNI) referenced for ingress/egress packets between a host and the SDN and between a backbone and the SDN; an overlay virtual local area network (VLAN) referenced for ingress/egress packets between a host and integrated P4 switching device 433; an overlay IP (used in local metadata for a source virtual machine/bare metal (VM/BM) internet protocol (IP) referenced for ingress/egress packets between the host and integrated P4 switching device 433; a source overlay IP and port for secure network address translation (SNAT) packets traversing virtual private endpoints; a source overlay IP and port for packets traversing public gateways; an underlay IP referenced for ingress/egress packets between the host and integrated P4 switching device 433; an underlay media access control address (MAC) referenced for ingress/egress packets between the host and integrated P4 switching device 433; local metadata for packets traversing a virtual provider edge (vPE) including a customer ID, a virtual private cloud (VPC) ID, and an endpoint gateway ID.

Within an ASIC comprising integrated P4 switching device 433, internal centralized processing unit 412 may contain: a centralized P4 unit and shared buffer memory. External to the ASIC, internal centralized processing unit 412 comprises shared memory (external memory 410a) and a set of CPU cores (CPU 410b).

The distribution of IP network state reduces the amount of per port P4 logic and external memory thereby reduces a solution cost. Integrated P4 switching device 433 provides the following functionality:
1. A distribution of IP network state processing between:
   a. Decentralized P4 based pipeline per port.
   b. A centralized P4 pipeline.
   c. A software based rules based processing pipeline that runs in external (or embedded) CPU cores.
2. A distribution of an IP network state between:
   a. Decentralized, ASIC embedded TCAM/caches per port.
   b. Centralized ASIC embedded TCAM/caches.
   c. External memory.
3. Each switch port is configured to perform data path processing of an IP network state such as, inter alia: multiprotocol label switching (MPLS) to SDN overlay mapping, VLAN/IP to SDN overlay mapping, secure gateway (SG), local metadata per VLAN/IP, etc.
4. A centralized SDN control plane configured to share an IP network state across a set of P4 based ports (vs having a per port network state).
5. A centralized SDN control plane configured to perform communications with an SDN controller.
6. Enabling IP/port/protocol quintuple on integrated P4 switching device 433 centralized SDN control plane for handling source identifying metadata.

Figure 5:
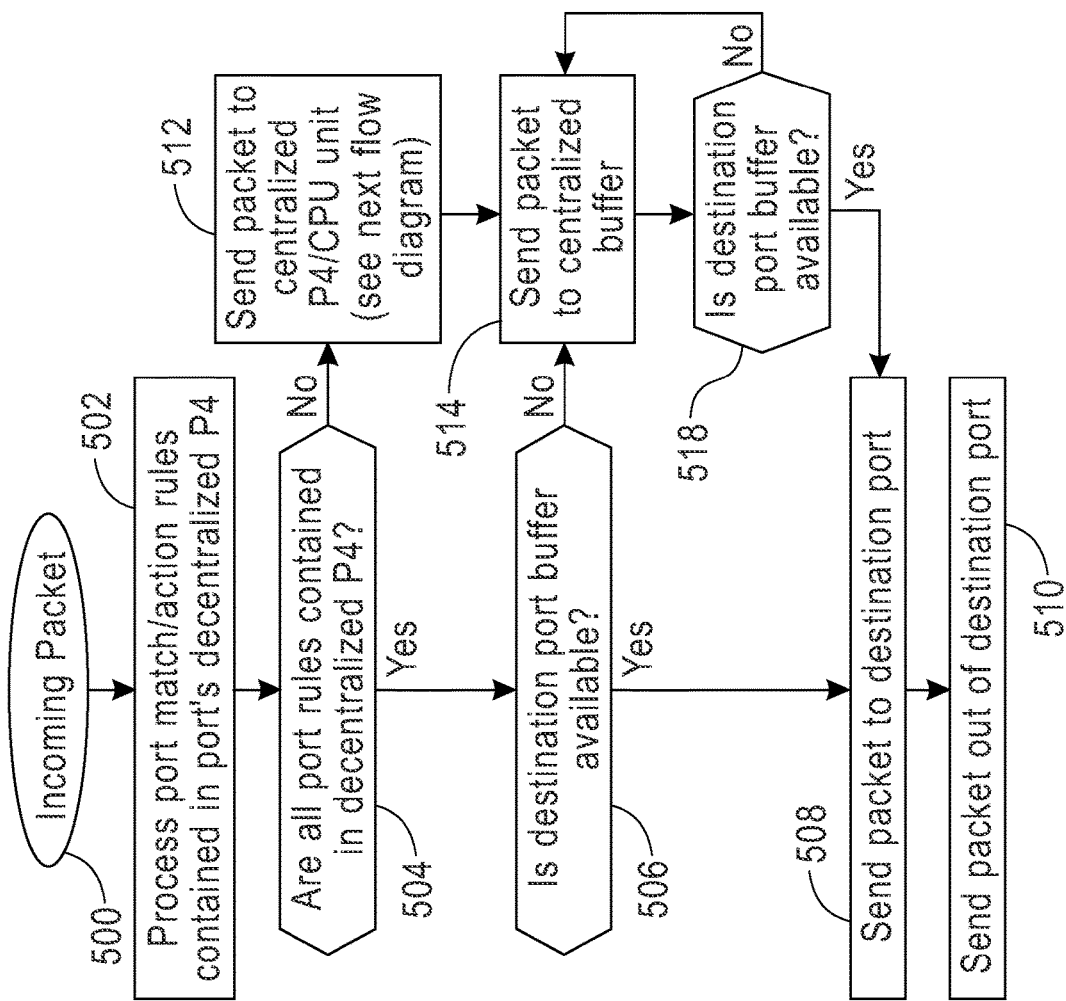
FIG. 5 illustrates an algorithm detailing a process flow for processing data packets comprising state matching decentralized P4 rules, in accordance with embodiments of the present invention.

FIG. 5 illustrates an algorithm detailing a process flow for processing data packets comprising state (for example states 524) matching decentralized P4 rules, in accordance with embodiments of the present invention. In step 500, an incoming data packet is received. In step 502, port match/action rules contained within a port decentralized P4 component are processed based on the incoming data packet. In step 504, it is determined if all port rules are contained within the decentralized P4 component. If in step 504, it is determined that all port rules are contained within the decentralized P4 component then in step 506 it is determined if a destination port buffer is available. If in step 506 it is determined that a destination port buffer is available then in step 508, the data packet is transmitted to a destination port and in step 510, the data packet is transmitted from the destination port.

If in step 504, it is determined that all port rules are not contained within the decentralized P4 component then in step 512, the data packet is transmitted to a centralized P4/CPU unit. In step 514, the data packet is transmitted to a centralized buffer unit and in step 518 it is determined if a destination port buffer is available. If in step 518 it is determined that a destination port buffer is available then step 508 is executed as described, supra. If in step 518 it is determined that a destination port buffer is not available then step 514 is repeated.

If in step 506, it is determined that a destination port buffer is not available then step 514 is executed as described, supra.

Figure 6:
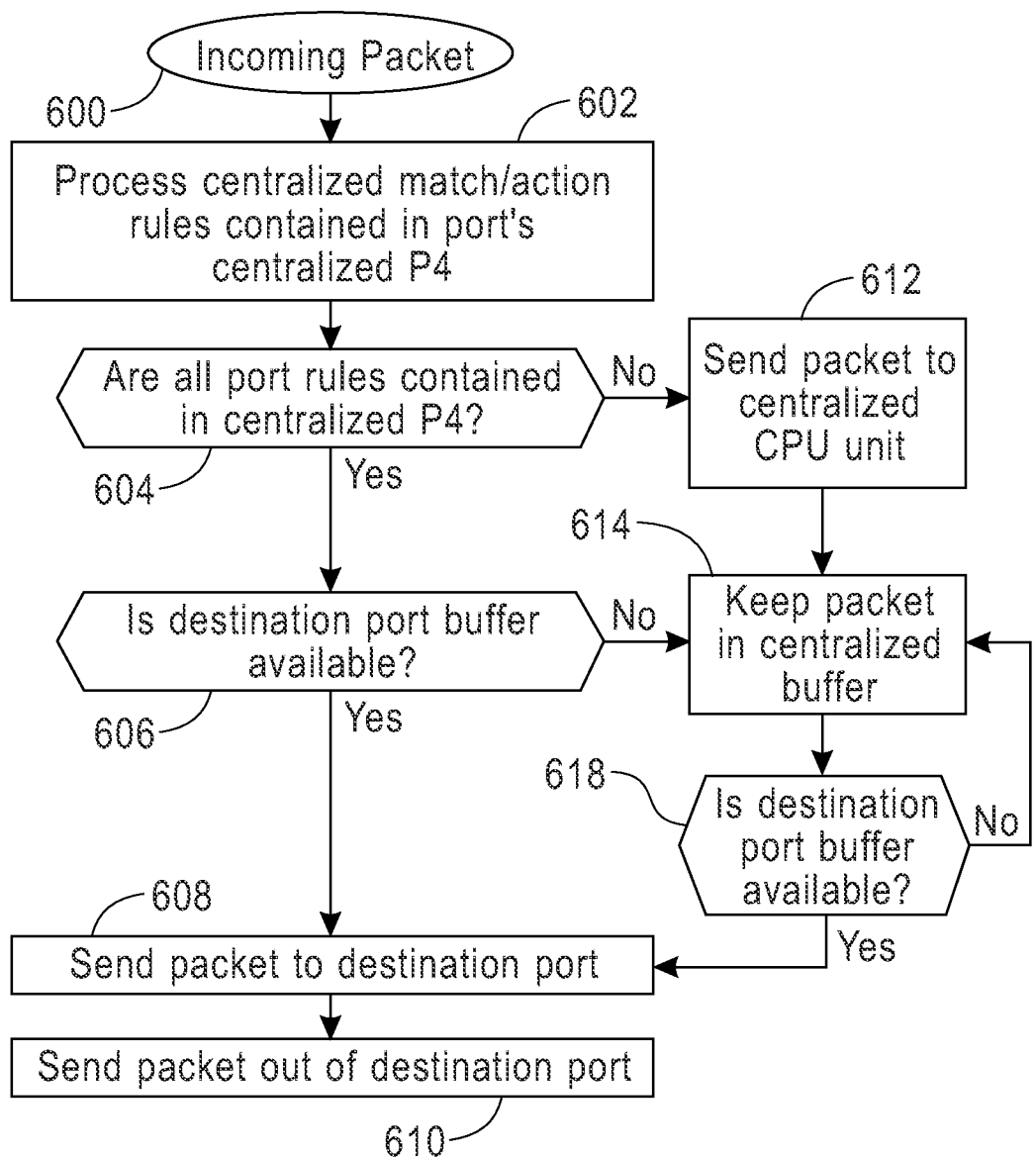
FIG. 6 illustrates an algorithm detailing a process flow for processing data packets comprising state matching centralized P4 rules, in accordance with embodiments of the present invention.

FIG. 6 illustrates an algorithm detailing a process flow for processing data packets comprising state matching centralized P4 rules, in accordance with embodiments of the present invention. In step 600, an incoming data packet is received. In step 602, port match/action rules contained within a port centralized P4 component are processed based on the incoming data packet. In step 604, it is determined if all port rules are contained within the centralized P4 component. If in step 604, it is determined that all port rules are contained within the centralized P4 component then in step 606 it is determined if a destination port buffer is available. If in step 606 it is determined that a destination port buffer is available then in step 608, the data packet is transmitted to a destination port and in step 610, the data packet is transmitted from the destination port.

If in step 604, it is determined that all port rules are not contained within the centralized P4 component then in step 612, the data packet is transmitted to a centralized CPU unit. In step 614, the data packet is stored within a centralized buffer unit and in step 618 it is determined if a destination port buffer is available. If in step 618 it is determined that a destination port buffer is available then step 608 is executed as described, supra. If in step 618 it is determined that a destination port buffer is not available then step 614 is repeated.

If in step 606, it is determined that a destination port buffer is not available then step 614 is executed as described, supra.

Figure 7:
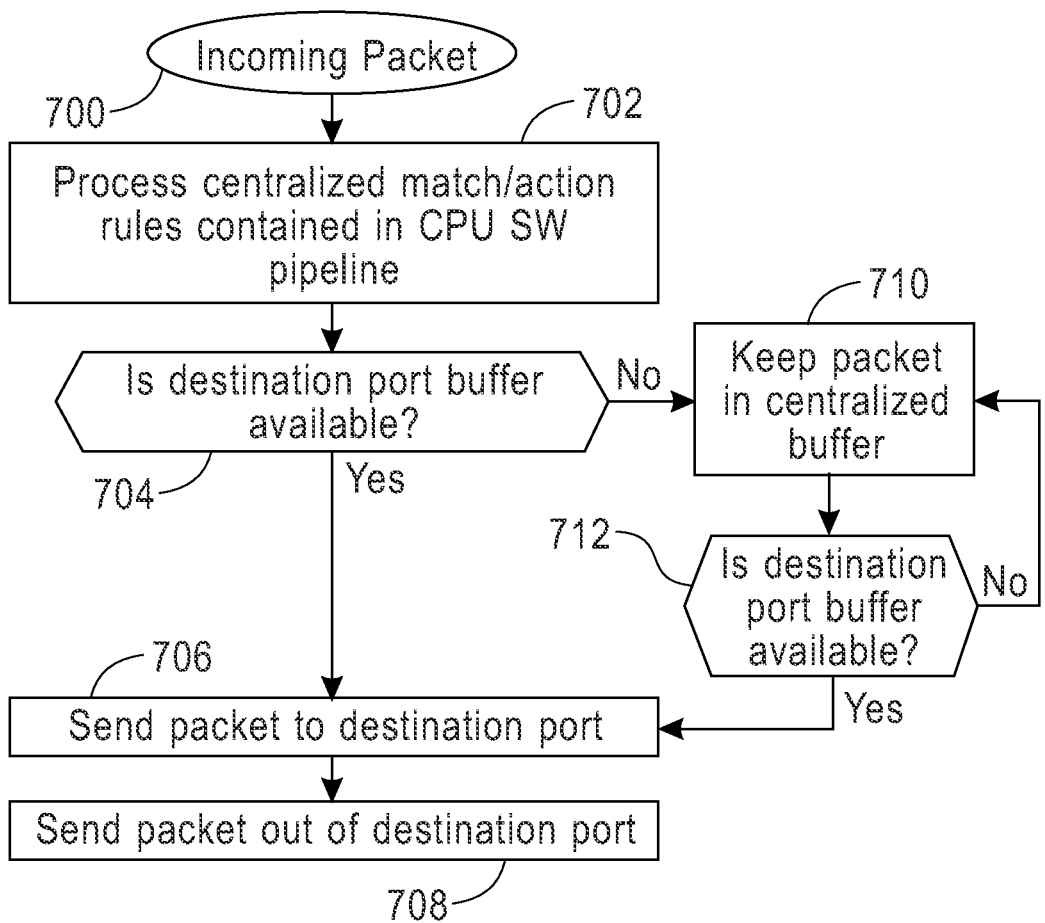
FIG. 7 illustrates an algorithm detailing a process flow for processing data packets comprising a state that does not match decentralized or centralized P4 rules, in accordance with embodiments of the present invention.

FIG. 7 illustrates an algorithm detailing a process flow for processing data packets comprising a state that does not match decentralized or centralized P4 rules, in accordance with embodiments of the present invention. In step 700, an incoming data packet is received. In step 702, centralized port match/action rules contained within a CPU SW pipeline are processed based on the incoming data packet. In step 704, it is determined if a destination port buffer is available. If in step 704 it is determined that a destination port buffer is available then in step 708, the data packet is transmitted to a destination port and in step 708, the data packet is transmitted from the destination port.

If in step 704, it is determined that a destination port buffer is not available then in step 710 the data packet is stored within a centralized buffer unit and in step 712 it is determined if a destination port buffer is available. If in step 712 it is determined that a destination port buffer is available then step 706 is executed as described, supra. If in step 712 it is determined that a destination port buffer is not available then step 712 is repeated.

Figure 8:
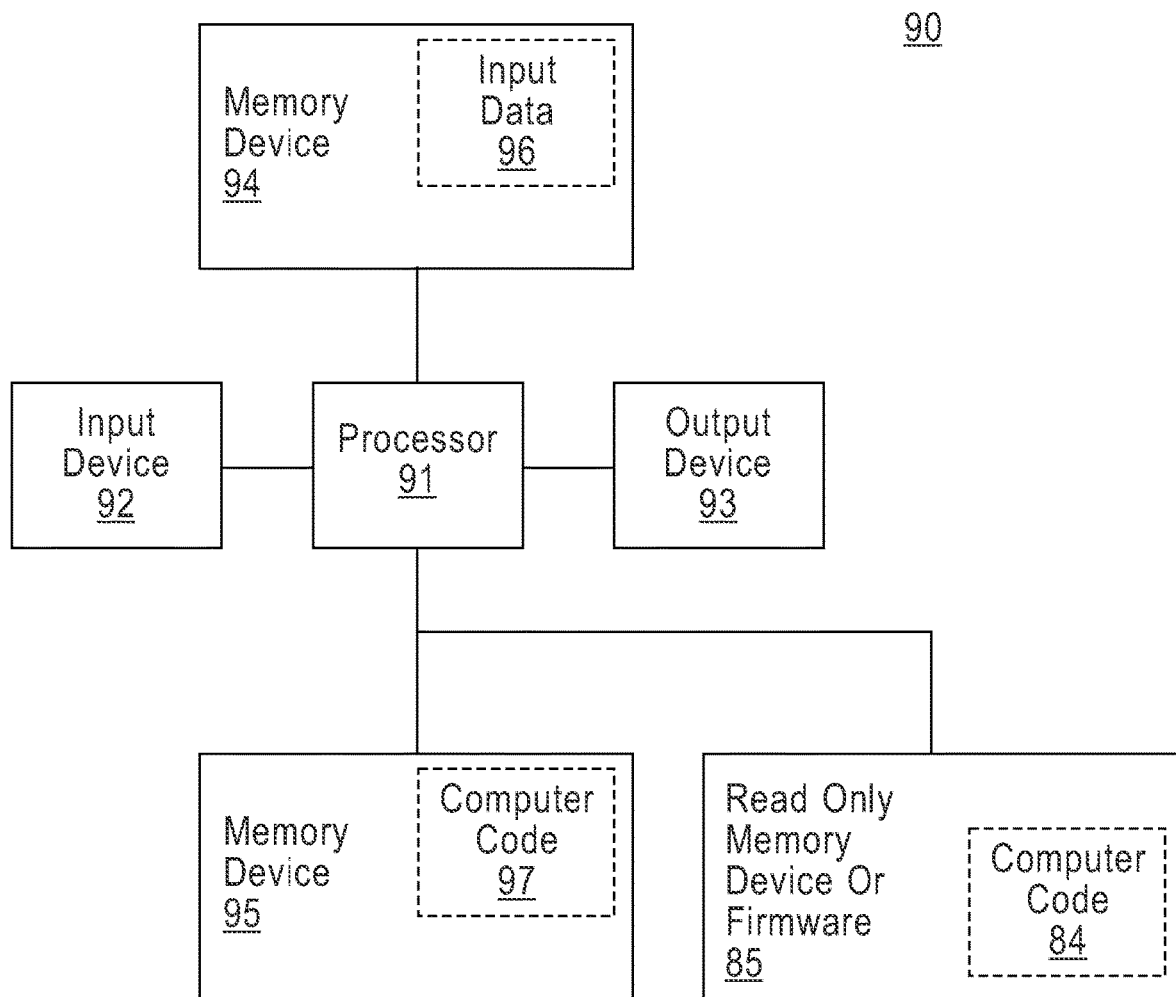
FIG. 8 illustrates a computer system used by the system of FIG. 1 for improving network switching technology associated with detecting operational states for ports, generating actions associated with the operational states with respect to data packets arriving at the ports, and enabling operational functionality of an integrated switching device with respect to execution of an incoming data packet at a destination port, in accordance with embodiments of the present invention.

FIG. 8 illustrates a computer system 90 (e.g., server 139 and integrated switching device 133 of FIG. 1) used by or comprised by the system 100 of FIG. 1 for improving network switching technology associated with detecting operational states for ports, generating actions associated with the operational states with respect to data packets arriving at the ports, and enabling operational functionality of an integrated switching device with respect to execution of an incoming data packet at a destination port, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 8 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2 and 5-7) for improving network switching technology associated with detecting operational states for ports, generating actions associated with the operational states with respect to data packets arriving at the ports, and enabling operational functionality of an integrated switching device with respect to execution of an incoming data packet at a destination port. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 85) may include algorithms (e.g., the algorithms of FIGS. 2 and 5-7) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve network switching technology associated with detecting operational states for ports, generating actions associated with the operational states with respect to data packets arriving at the ports, and enabling operational functionality of an integrated switching device with respect to execution of an incoming data packet at a destination port. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving network switching technology associated with detecting operational states for ports, generating actions associated with the operational states with respect to data packets arriving at the ports, and enabling operational functionality of an integrated switching device with respect to execution of an incoming data packet at a destination port. In another embodiment, the invention provides a business method that performs the process steps of the invention on a subscription, advertising, and/or fee basis. That is, a service supplier, such as a Solution Integrator, could offer to enable a process for improving network switching technology associated with detecting operational states for ports, generating actions associated with the operational states with respect to data packets arriving at the ports, and enabling operational functionality of an integrated switching device with respect to execution of an incoming data packet at a destination port. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 8 shows the computer system 90 as a particular configuration of hardware and software, any configuration of hardware and software, as would be known to a person of ordinary skill in the art, may be utilized for the purposes stated supra in conjunction with the particular computer system 90 of FIG. 8. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
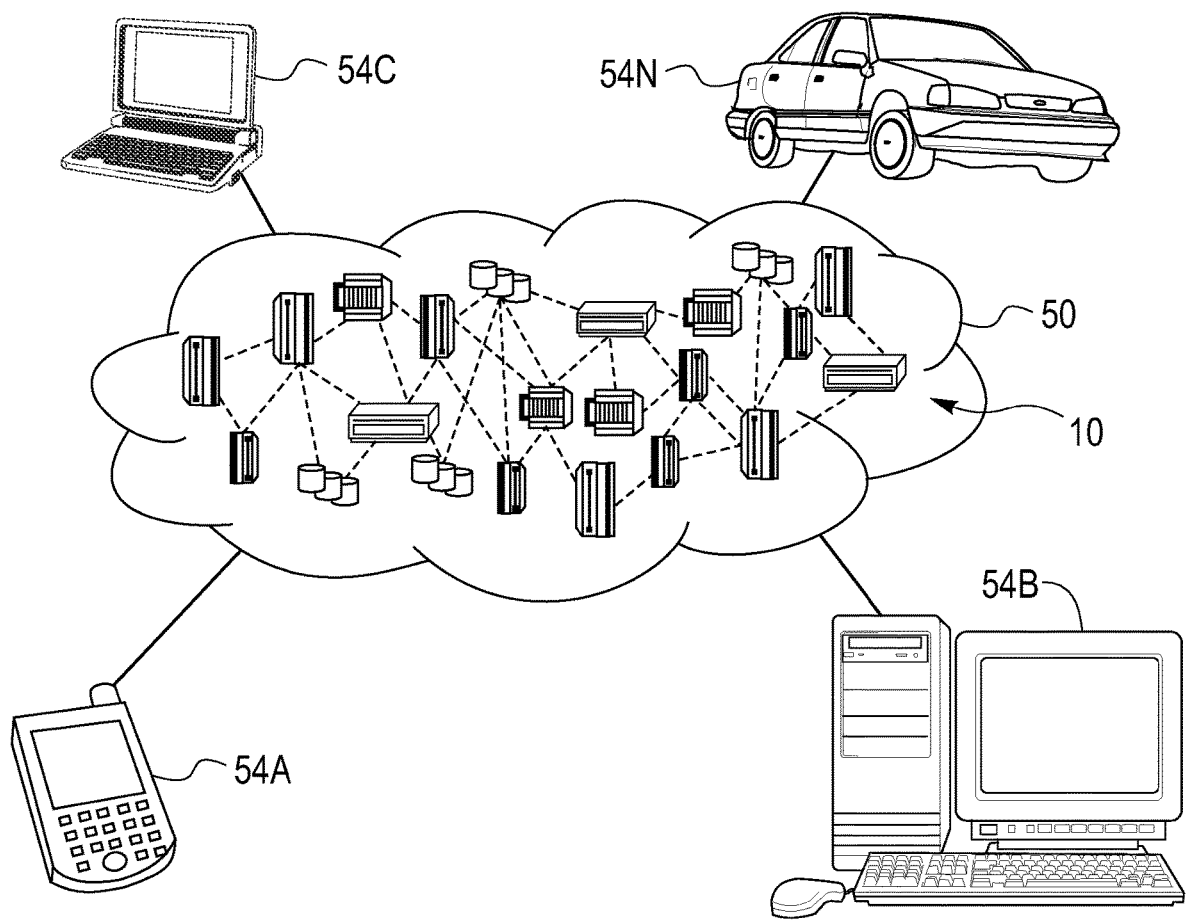
FIG. 9 illustrates a cloud computing environment, in accordance with embodiments of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 12 are intended to be illustrative only and that computing nodes 10 and cloud computing environment 50 can communicate with any type of computerized device over any type of network and/or network addressable connection (e.g., using a web browser).

Figure 10:
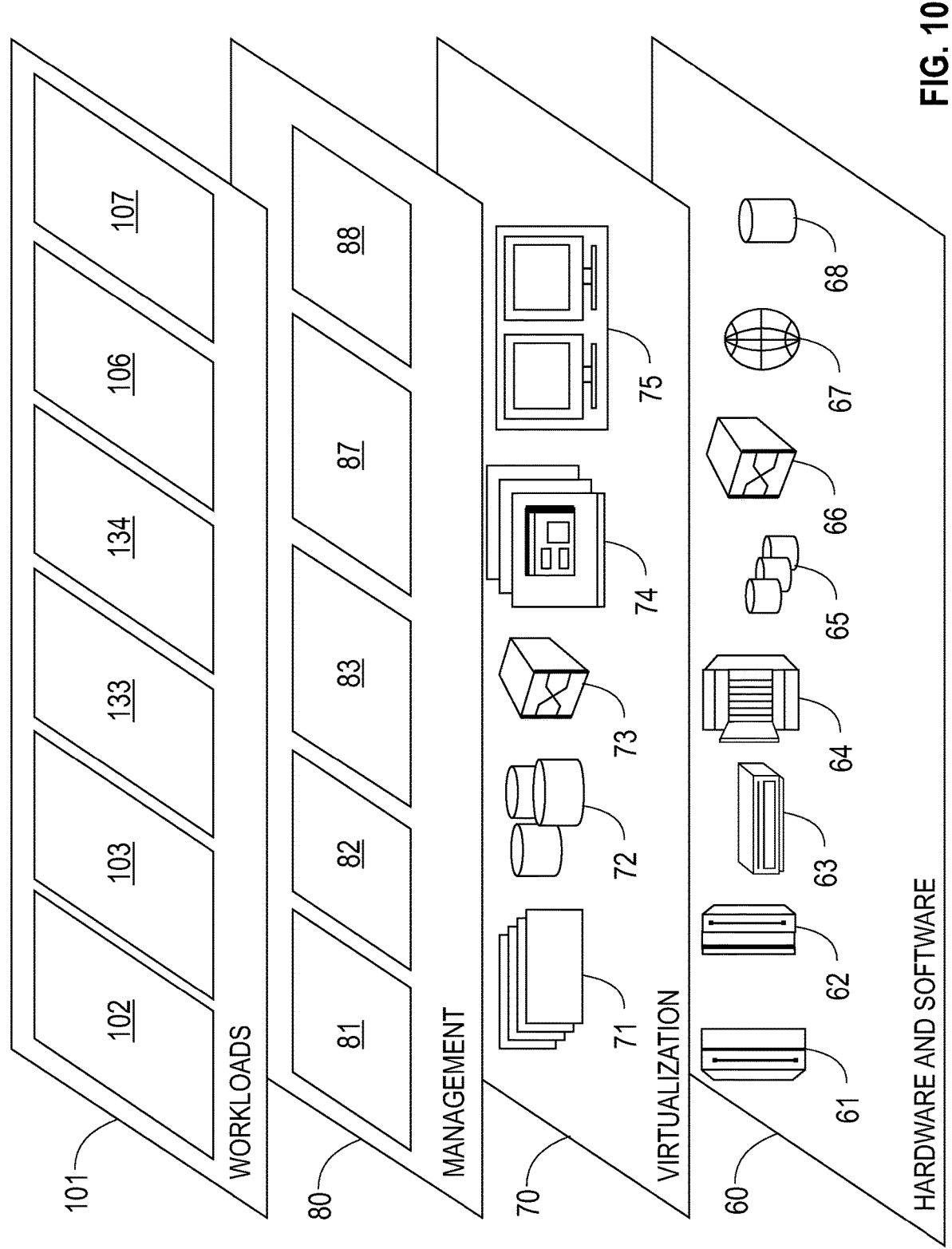
FIG. 10 illustrates a set of functional abstraction layers provided by cloud computing environment, in accordance with embodiments of the present invention.

Referring now to FIG. 10, a set of functional abstraction layers provided by cloud computing environment 50 (see FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 133; data analytics processing 134; transaction processing 106; and for improving network switching technology associated with detecting operational states for ports, generating actions associated with the operational states with respect to data packets arriving at the ports, and enabling operational functionality of an integrated switching device with respect to execution of an incoming data packet at a destination port 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An integrated P4 switching device comprising a processor coupled to a computer-readable memory unit, the memory unit comprising instructions that when executed by the processor implements a network state processing method comprising:

detecting, by said processor, operational states for ports of a server Internet protocol (IP) data plane component;

analyzing, by said processor, each operational state of said operational states;

generating, by said processor based on results of said analyzing, matching and action rules associated with said operational states with respect to data packets arriving at said ports;

storing, by said processor, data describing each said operational state within at least one port cache structure for at least one port of said ports;

detecting, by said processor, an incoming data packet at a first port of said ports;

distributing, by said processor, said matching and action rules between port engines of said ports and said processor;

executing, by said processor in response to said detecting and said distributing, said matching and action rules with respect to said incoming data packet;

transmitting, by said processor in response to results of said executing, said incoming data packet to a destination port of said ports;

enabling, by said processor, operational functionality of said integrated P4 switching device with respect to execution of said incoming data packet at said destination port, wherein said integrated P4 switching device comprises said ports, said at least one port cache structure, and said port engines; and distributing, by said processor, Internet Protocol (IP) network state processing and storage (i) between said port engines and said cache structures associated with the port engines at said ports and a centralized P4/central processing unit (CPU) processing unit that utilizes external memory shared across switch ports or (ii) between a decentralized P4 based pipeline per ort, a centralized P4 pipeline, and a software based rules based processing pipeline that runs in external or embedded central processing unit (CPU) cores.

2. The integrated P4 switching device of claim 1, wherein said distributing said matching and action rules comprises:
detecting that said matching and action rules are not located within said at least one port cache structure;
retrieving said matching and action rules from an internal memory of said processor for processing;
detecting that a buffer of said destination port is currently available; and
enabling said transmitting.

3. The integrated P4 switching device of claim 1, wherein said distributing said matching and action rules comprises:
detecting that said matching and action rules are not located within said at least one port cache structure;
transferring said matching and action rules to an internal memory of said processor for execution;
detecting that a buffer of said destination port is currently available; and
enabling said transmitting.

4. The integrated P4 switching device of claim 1, wherein said distributing said matching and action rules comprises:
detecting that a buffer of said destination port is currently available; and
enabling said transmitting.

5. The integrated P4 switching device of claim 1, wherein said distributing said matching and action rules comprises:
detecting that said matching and action rules are located within said at least one port cache structure; and
enabling said transmitting.

6. The integrated P4 switching device of claim 1, wherein said processor comprises centralized programming protocol-independent packet processor (P4) code comprising said matching and action rules.

7. The integrated P4 switching device of claim 1, wherein said processor comprises decentralized programming protocol-independent packet processor (P4) code comprising said matching and action rules.

8. A network state processing method comprising:
detecting, by a processor of an integrated P4 switching device, operational states for ports of a server Internet protocol (IP) data plane component;

analyzing, by said processor, each operational state of said operational states;

generating, by said processor based on results of said analyzing, matching and action rules associated with said operational states with respect to data packets arriving at said ports;

storing, by said processor, data describing each said operational state within at least one port cache structure for at least one port of said ports;

detecting, by said processor, an incoming data packet at a first port of said ports;

distributing, by said processor, said matching and action rules between port engines of said ports and said processor;

executing, by said processor in response to said detecting and said distributing, said matching and action rules with respect to said incoming data packet;

transmitting, by said processor in response to results of said executing, said incoming data packet to a destination port of said ports;

enabling, by said processor, operational functionality of said integrated P4 switching device with respect to execution of said incoming data packet at said destination port, wherein said integrated P4 switching device comprises said ports, said at least one port cache structure, and said port engines; and distributing, by said processor, Internet Protocol (IP) network state processing and storage (i) between said port engines and said cache structures associated with the port engines at said ports and a centralized P4/central processing unit (CPU) processing unit that utilizes external memory shared across switch ports or (ii) between a decentralized P4 based pipeline per ort, a centralized P4 pipeline, and a software based rules based processing pipeline that runs in external or embedded central processing unit (CPU) cores.

9. The method of claim 8, wherein said distributing said matching and action rules comprises:
detecting that said matching and action rules are not located within said at least one port cache structure;
retrieving said matching and action rules from an internal memory of said processor for processing;
detecting that a buffer of said destination port is currently available; and
enabling said transmitting.

10. The method of claim 8, wherein said distributing said matching and action rules comprises:
detecting that said matching and action rules are not located within said at least one port cache structure;
transferring said matching and action rules to an internal memory of said processor for execution;
detecting that a buffer of said destination port is currently available; and
enabling said transmitting.

11. The method of claim 8, wherein said distributing said matching and action rules comprises:
  detecting that a buffer of said destination port is currently available; and
  enabling said transmitting.

12. The method of claim 8, wherein said distributing said matching and action rules comprises:
  detecting that said matching and action rules are located within said at least one port cache structure; and
  enabling said transmitting.

13. The method of claim 8, wherein said processor comprises centralized programming protocol-independent packet processor (P4) code comprising said matching and action rules.

14. The method of claim 8, wherein said processor comprises decentralized programming protocol-independent packet processor (P4) code comprising said matching and action rules.

15. The method of claim 8, further comprising:
  providing at least one support service for at least one of creating, integrating, hosting, maintaining, and deploying computer-readable code in the integrated P4 switching device, said code being executed by the processor to implement: said detecting said operational states, said analyzing, said generating, said storing, said detecting said incoming data packet, said distributing, said executing, said transmitting, and said enabling.

16. A computer program product, comprising a computer readable hardware storage device storing a computer readable program code, said computer readable program code comprising an algorithm that when executed by a processor of an integrated P4 switching device implements a network state processing method, said method comprising:
  detecting, by a processor of an integrated P4 switching device, operational states for ports of a server Internet protocol (IP) data plane component;
  analyzing, by said processor, each operational state of said operational states;
  generating, by said processor based on results of said analyzing, matching and action rules associated with said operational states with respect to data packets arriving at said ports;
  storing, by said processor, data describing each said operational state within at least one port cache structure for at least one port of said ports;
  detecting, by said processor, an incoming data packet at a first port of said ports;
  distributing, by said processor, said matching and action rules between port engines of said ports and said processor;
  executing, by said processor in response to said detecting and said distributing, said matching and action rules with respect to said incoming data packet;
  transmitting, by said processor in response to results of said executing, said incoming data packet to a destination port of said ports;
  enabling, by said processor, operational functionality of said integrated P4 switching device with respect to execution of said incoming data packet at said destination port, wherein said integrated P4 switching device comprises said ports, said at least one port cache structure, and said port engines; and
  distributing, by said processor, Internet Protocol (IP) network state processing and storage (i) between said port engines and said cache structures associated with the port engines at said ports and a centralized P4/central processing unit (CPU) processing unit that utilizes external memory shared across switch ports or (ii) between a decentralized P4 based pipeline per ort, a centralized P4 pipeline, and a software based rules based processing pipeline that runs in external or embedded central processing unit (CPU) cores.

17. The computer program product of claim 16, wherein said distributing said matching and action rules comprises:
  detecting that said matching and action rules are not located within said at least one port cache structure;
  retrieving said matching and action rules from an internal memory of said processor for processing;
  detecting that a buffer of said destination port is currently available; and
  enabling said transmitting.

18. The computer program product of claim 16, wherein said distributing said matching and action rules comprises:
  detecting that said matching and action rules are not located within said at least one port cache structure;
  transferring said matching and action rules to an internal memory of said processor for execution;
  detecting that a buffer of said destination port is currently available; and
  enabling said transmitting.

19. The computer program product of claim 16, wherein said distributing said matching and action rules comprises:
  detecting that a buffer of said destination port is currently available; and
  enabling said transmitting.

20. The computer program product of claim 16, wherein said distributing said matching and action rules comprises:
  detecting that said matching and action rules are located within said at least one port cache structure; and
  enabling said transmitting.

* * * * *